US011082380B2

(12) United States Patent
Linguanti et al.

(10) Patent No.: US 11,082,380 B2
(45) Date of Patent: Aug. 3, 2021

(54) SYSTEMS AND METHODS FOR PROVIDING IN-APPLICATION MESSAGING

(71) Applicant: Universal City Studios LLC, Universal City, CA (US)

(72) Inventors: Nicholas Anthony Linguanti, Orlando, FL (US); Kimberly Anne Humphreys, Orlando, FL (US); Humberto Augusto Kam, Orlando, FL (US)

(73) Assignee: Universal City Studios LLC, Universal City, CA (US)

(*) Notice: Subject to any disclaimer, the term of this patent is extended or adjusted under 35 U.S.C. 154(b) by 0 days.

(21) Appl. No.: 16/539,703

(22) Filed: Aug. 13, 2019

(65) Prior Publication Data

US 2020/0374253 A1    Nov. 26, 2020

Related U.S. Application Data

(60) Provisional application No. 62/852,660, filed on May 24, 2019.

(51) Int. Cl.
*G06F 15/16* (2006.01)
*H04L 12/58* (2006.01)
*G07C 11/00* (2006.01)
*G10L 19/018* (2013.01)

(52) U.S. Cl.
CPC ............. *H04L 51/18* (2013.01); *G07C 11/00* (2013.01); *G10L 19/018* (2013.01); *G07C 2011/02* (2013.01)

(58) Field of Classification Search
CPC ......... H04L 67/18; H04L 51/18; G10L 19/00; G10L 19/018
See application file for complete search history.

(56) References Cited

U.S. PATENT DOCUMENTS

| | | | |
|---|---|---|---|
| 6,389,055 B1 | 5/2002 | August et al. | |
| 6,396,937 B2 | 5/2002 | Chen et al. | |
| 6,785,539 B2 | 8/2004 | Hale et al. | |
| 7,706,904 B2 | 4/2010 | Jones et al. | |
| 9,183,580 B2 | 11/2015 | Rhoads et al. | |
| 9,305,559 B2 | 4/2016 | Sharma et al. | |
| 9,485,603 B2 | 11/2016 | Worrall et al. | |
| 9,609,377 B2 | 3/2017 | Hale et al. | |
| 2007/0188501 A1* | 8/2007 | Yee ......................... | G06T 15/20 345/473 |

(Continued)

OTHER PUBLICATIONS

PCT/US2020/033649 International Search Report and Written Opinion dated Sep. 23, 2020.

*Primary Examiner* — Yves Dalencourt
(74) *Attorney, Agent, or Firm* — Fletcher Yoder P.C.

(57) ABSTRACT

Systems and methods presented herein provide an in-application messaging system that includes an audio generation system configured to encode at least one audio watermark within an audio signal, and to broadcast the audio signal into a physical environment. The in-application messaging system also includes a portable electronic device configured to receive the audio signal from the physical environment, to identify the at least one audio watermark encoded within the audio signal, and to display in-application messaging information via an application running on the portable electronic device. The in-application messaging information is based at least in part on the at least one audio watermark.

26 Claims, 5 Drawing Sheets

(56) References Cited

U.S. PATENT DOCUMENTS

| | | | |
|---|---|---|---|
| 2010/0134278 A1* | 6/2010 | Srinivasan | G06Q 30/02 340/539.13 |
| 2013/0262687 A1* | 10/2013 | Avery | G06F 9/54 709/229 |
| 2016/0005080 A1* | 1/2016 | Courtney, III | H04L 67/18 705/14.58 |
| 2018/0225717 A1 | 8/2018 | Storti | |

* cited by examiner

SYSTEMS AND METHODS FOR PROVIDING IN-APPLICATION MESSAGING

CROSS-REFERENCE TO RELATED APPLICATION

This application claims priority to and the benefit of U.S. Provisional Application No. 62/852,660, entitled "Systems and Methods for Providing In-Application Messaging," filed May 24, 2019, which is hereby incorporated by reference in its entirety for all purposes.

BACKGROUND

The present disclosure relates generally to systems and methods for providing in-application messaging. More specifically, embodiments of the present disclosure relate generally to systems and methods that enable guests of an amusement park to view in-application messaging related to attractions of the amusement park, which are generated via audio watermarking encoded within audio provided with respect to the particular attractions.

Amusement parks may include various entertainment attractions, restaurants, souvenir shops, and rides useful in providing enjoyment to guests (e.g., families and/or people of all ages) of the amusement park. These attractions may be associated with audio and/or video presentations that contribute to the entertainment value. However, the guests of the amusement park may desire additional information relating to the attractions. In addition, certain guests may not hear as well as other guests, such that provision of additional information relating to the attractions would be appreciated.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In certain embodiments, an in-application messaging system includes an audio generation system configured to encode at least one audio watermark within an audio signal, and to broadcast the audio signal into a physical environment. The in-application messaging system also includes a portable electronic device configured to receive the audio signal from the physical environment, to identify the at least one audio watermark encoded within the audio signal, and to display in-application messaging information via an application running on the portable electronic device. The in-application messaging information is based at least in part on the at least one audio watermark.

In addition, in certain embodiments, a portable electronic device includes an audio sensor configured to detect an audio signal broadcast into a physical environment. The portable electronic device also includes processing circuitry configured to identify at least one audio watermark encoded within the audio signal, and to cause a display of the portable electronic device to display in-application messaging information based at least in part on the at least one audio watermark.

In addition, in certain embodiments, an in-application messaging system includes an audio generation system configured to encode at least one audio watermark within an audio signal. The in-application messaging system also includes one or more audio systems configured to broadcast the audio signal into a physical environment.

Various refinements of the features noted above may be undertaken in relation to various aspects of the present disclosure. Further features may also be incorporated in these various aspects as well. These refinements and additional features may exist individually or in any combination.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example to allow for deviations associated with manufacturing imperfections and associated tolerances.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Amusement park attractions have become increasingly popular, and various amusement park attractions have been created to provide guests of the amusement park with unique audio and visual experiences. However, auxiliary systems and methods to further enhance these experiences are desirable. For example, the embodiments described herein facilitate the communication of additional information relating to various amusement park attractions via portable electronic devices, such as mobile phones (e.g., smartphones), tablet computers, wearable devices (e.g., such as glasses, goggles, watches, and so forth), or any other suitable devices that may be carried around by guests of an amusement park. In particular, in certain embodiments, an in-application messaging system may be used to broadcast audio into a physical environment of an amusement park attraction, wherein the audio includes audio watermarking that encodes data relating to captioning associated with the amusement park attraction, data relating to multilingual messaging associated with the amusement park attraction, data relating to special guided tours associated with the amusement park attraction, data relating to hidden secrets associated with the amusement park attraction, and so forth. The portable electronic devices may receive the broadcasted audio and, depending on certain settings of the particular portable electronic device (e.g., whether in-application messaging has been selected), may cause an application running on the particular portable electronic device to display information relating to the data encoded within the audio watermarking.

Furthermore, in certain embodiments, depending on whether a camera of the particular portable electronic device has been activated (e.g., by a guest using the portable electronic device), the information relating to the data encoded within the audio watermarking may be displayed on the portable electronic device alongside images and/or video captured by the camera of the portable electronic device. Moreover, in certain embodiments, the in-application messaging system may be used to encode video watermarking within certain cinematic presentations associated with the amusement park attraction. If the camera of the portable electronic device has been activated, the camera may detect the video watermarking by capturing a video of the cinematic presentation and, depending on certain settings of the particular portable electronic device (e.g., whether the in-application messaging has been selected), may cause the application running on the particular portable electronic device to display information relating to the data encoded within the video watermarking.

Figure 1:
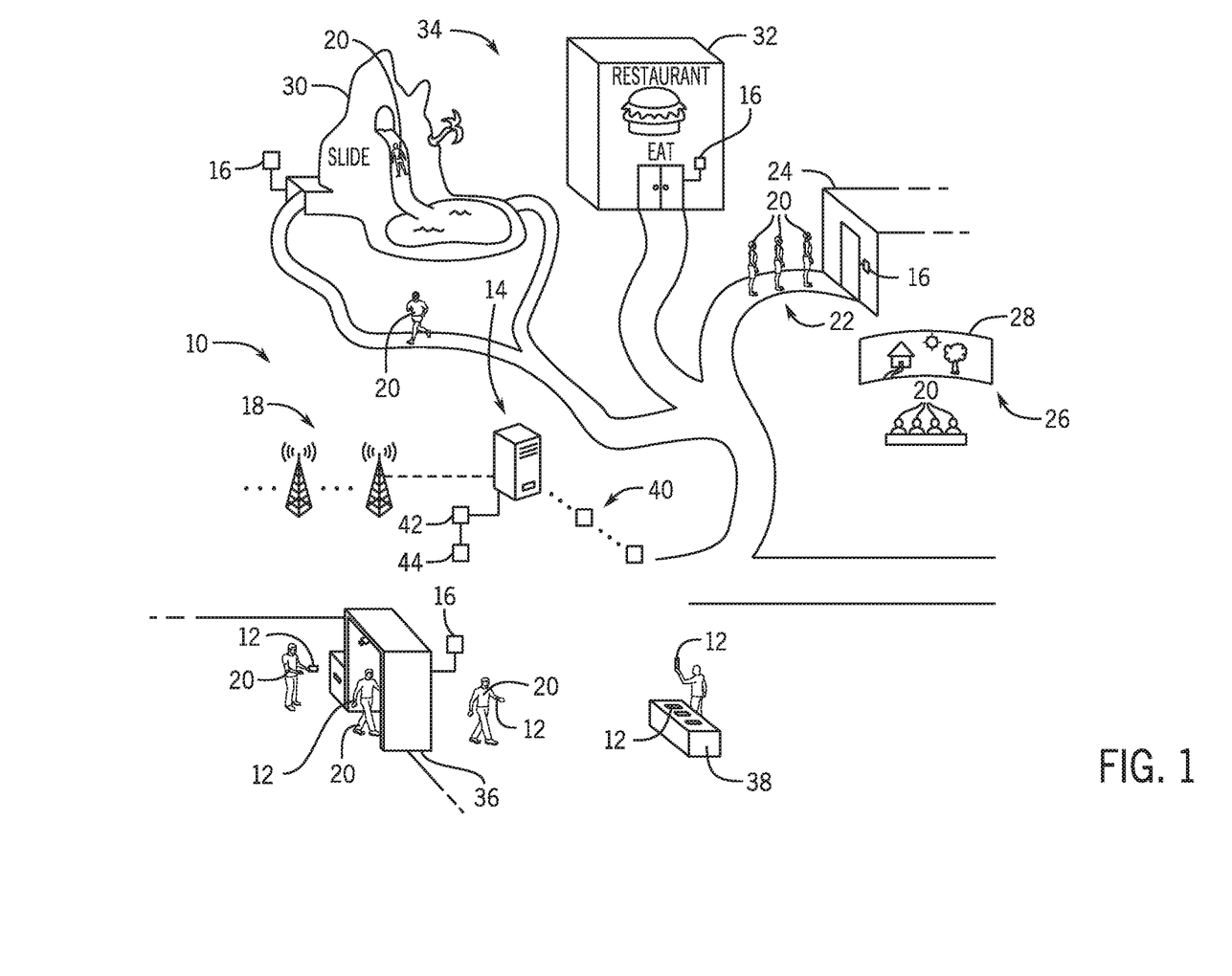
FIG. 1 is a schematic representation of an amusement park configured to provide in-application messaging via portable electronic devices used by guests of the amusement park, in accordance with embodiments of the present disclosure.

With this in mind, FIG. 1 is a schematic representation of an amusement park 10 configured to provide in-application messaging via portable electronic devices 12 used by guests 20 of the amusement park 10. As illustrated, in certain embodiments, the amusement park 10 includes an in-application messaging system 14, which is configured to encode audio watermarking within audio delivered via one or more audio systems 16 located within the amusement park 10, wherein the audio watermarking may be used by the portable electronic devices 12 to provide in-application messaging (e.g., captioning, multilingual messaging, special guided tours, hidden secrets, and so forth) relating to various attractions of the amusement park 10. For example, audio systems 16 located within a particular attraction of the amusement park 10 may provide audio relating to the particular attraction, and the audio may include audio watermarking specifically related to the particular attraction. In the embodiment illustrated in FIG. 1, the in-application messaging system 14 includes a wireless communication system 18 configured to facilitate communication of the audio to the audio systems 16 located around the amusement park 10. In other words, the in-application messaging system 14 may be implemented as a centralized system that wirelessly communicates with the audio systems 16 located around the amusement park 10. However, in other embodiments, the in-application messaging system 14 may be local to the particular attractions 24.

As such, the embodiments described herein facilitate the provision of in-application messaging via portable electronic devices 12 carried by guests 20 by detecting audio watermarking encoded within audio received from the audio systems 16 located around the amusement park 10. For example, while guests 20 are waiting in a loading queue 22 for a particular attraction 24 (e.g., a ride), the guests 20 may be provided with in-application messaging related to the particular attraction 24 for which they are in the loading queue 22 so as to entertain the guests 20 while they wait in the loading queue 22. As another example, during certain cinematic presentations being presented (e.g., via one or more display systems 28) at a particular attraction (e.g., a theater 26), guests 20 may be provided within in-application messaging related to the particular cinematic presentation so as to provide the guests 20 with additional information relating to the cinematic presentation. Indeed, in-application messaging may be provided related to any type of attraction of the amusement park 10. For example, in app-messaging may be provided in and around water slides 30 and other types of thrill rides, recreational areas, and so forth. Furthermore, in app-messaging may also be provided for non-ride attractions, such as restaurants 32 as well as for park areas 34 (e.g., park "villages") that have particular themes.

As described in greater detail herein, the in-application messaging may be provided via an application running on a portable electronic device 12 that is owned by a guest 20. In certain embodiments, when guests 20 arrive at an entryway 36 (e.g., hotel front desk, kiosk, guest service counter, park gate), the guests 20 may be provided with entry credentials (e.g., tickets or active wearables, which may run the application that provides the in-application messaging) among other items, such as a park map, virtual queuing instructions, and amenities instructions. However, in some instances, guests 20 may have obtained entry credentials prior to arrival and may skip acquiring such credentials at the entryway 36. In either situation, the entry credentials may be linked to an application running on portable electronic devices 12 owned by the guests 20. Informational media (e.g., audio, video) and instructional signage may be present at the entryways 36. Furthermore, in certain embodiments, if guests 20 do not have the application installed on their portable electronic device 12, they may be prompted to download the application as they pass through the entryway (or shortly thereafter). As described in greater detail herein, the audio and video presented at the entryways 36 may also be supplemented with in-application messaging via the application running on the portable electronic devices 12 of the guests 20. In certain situations, if guests 20 do not have a portable electronic device 12 with them, a portable electronic device 12 may be distributed to them, for example, at a kiosk 38 just within an entryway 36 of the amusement park 10.

As described in greater detail herein, the in-application messaging is provided to the portable electronic devices 12 via the in-application messaging system 14, which may include one or more computers 40, each of which include at least one processor 42 and at least one memory 44, which may communicate the audio that includes the audio watermarking to the audio systems 16 located around the amusement park 10.

Figure 2:
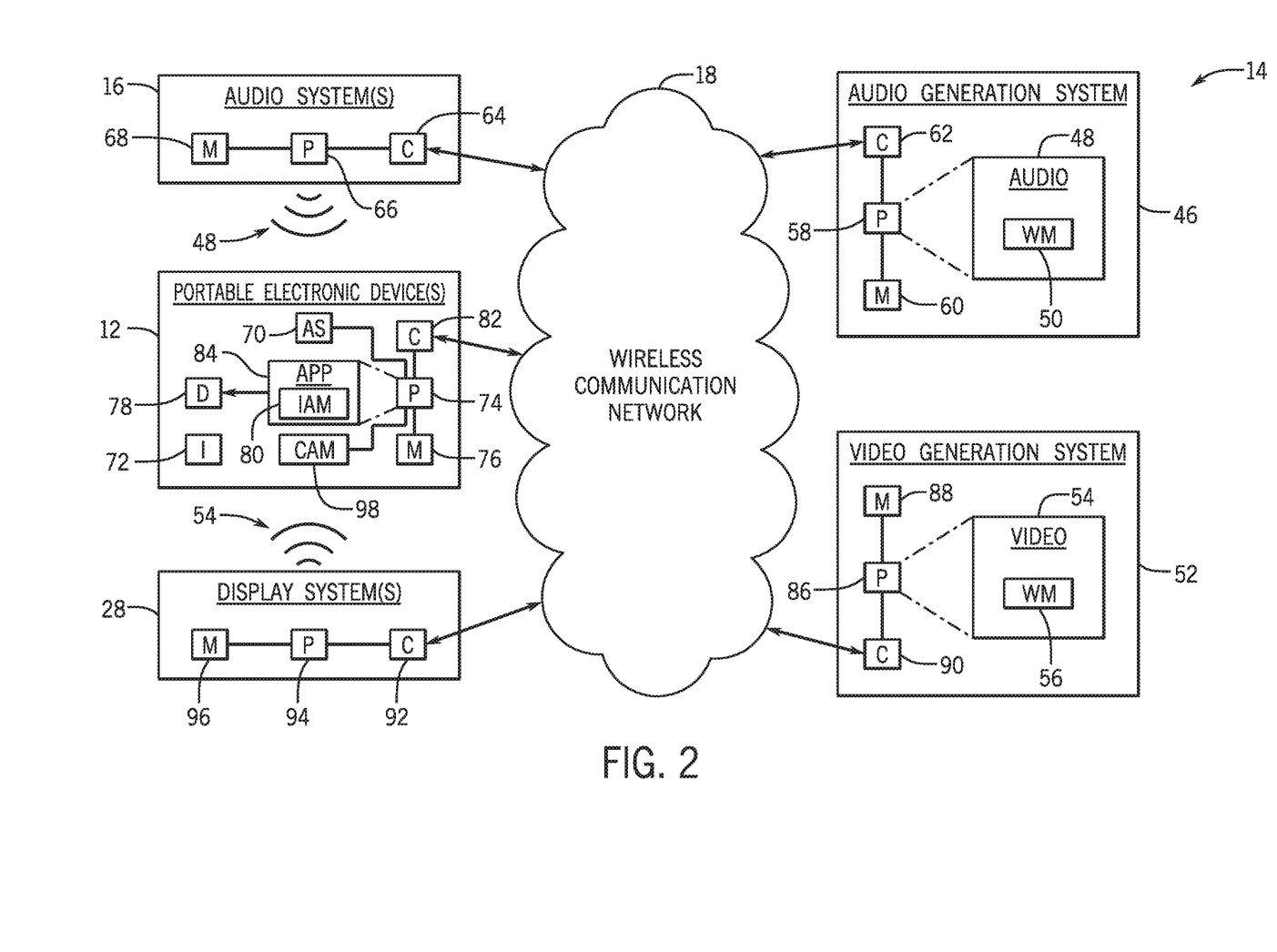
FIG. 2 is a schematic diagram of an in-application messaging system for providing in-application messaging via an application running on a portable electronic device, in accordance with embodiments of the present disclosure.

FIG. 2 is a schematic diagram of the in-application messaging system 14 for providing in-application messaging via an application running on a portable electronic device 12 that is either owned by a guest 20 or distributed to the guest 20 by the amusement park 10. As illustrated in FIG. 2, in certain embodiments, the in-application messaging system 14 may include one or more portable electronic devices 12 that may be used by the guests 20 of the amusement park 10. In addition, as also illustrated in FIG. 2, in certain embodiments, the in-application messaging system 14 may include an audio generation system 46 configured to generate audio 48 that includes audio watermarking 50 encoded therein, which may be broadcast by one or more audio systems 16 located around the amusement park 10, and which may be detected by the one or more portable electronic devices 12 to generate in-application messaging, which may be displayed via an application running on the one or more portable electronic devices 12. In addition, as also illustrated in FIG. 2, in certain embodiments, the in-application messaging system 14 may include a video generation system 52 configured to generate video 54 that includes video watermarking 56 encoded therein, which may be broadcast by one or more display systems 28 located around the amusement park 10, and which may be detected by the one or more portable electronic devices 12 to generate in-application messaging, which may be displayed via an application running on the one or more portable electronic devices 12. It will be appreciated that, in certain embodiments, the in-application messaging system 14 illustrated in FIG. 2 may only be used to provide in-application messaging for a particular attraction of the amusement park 10. However, in other embodiments, the in-application messaging system 14 may be used to coordinate and provide in-application messaging for any number, if not all, of the attractions of the amusement park 10.

As illustrated in FIG. 2, in certain embodiments, the audio generation system 46 may include processing circuitry, such as a processor 58 and a memory 60, which may be used to generate the audio 48 that includes the audio watermarking 50 related to a particular attraction of the amusement park 10. More specifically, the processor 58 may execute processor-executable instructions stored in a tangible non-transitory computer-readable medium, such as the memory 60 and/or other storage, to generate the audio watermarking 50 utilizing audio watermarking algorithms, such as spread spectrum audio watermarking algorithms, low bit audio watermarking algorithms, phase coding audio watermarking algorithms, echo hiding audio watermarking algorithms, time scale modification audio watermarking algorithms, amplitude modification audio watermarking algorithms, replica modulation audio watermarking algorithms, dither audio watermarking algorithms, self-marking audio watermarking algorithms, or some combination thereof, and to encode the audio watermarking 50 within the audio 48 that is provided to the one or more audio systems 16. In certain embodiments, the processor 58 may be a general-purpose processor, system-on-chip (SoC) device, an application-specific integrated circuit (ASIC), or some other similar processor configuration.

In certain embodiments, the audio generation system 46 may be configured to communicate the audio 48 to the one or more audio systems 16 located around the amusement park 10 via the wireless communication system 18 (e.g., wireless local area network (WLAN]), wireless wide area network (WWAN), near field communication (NFC) network, or any other suitable wireless network). In such embodiments, the audio generation system 46 may include communication circuitry 62 configured to wirelessly communicate with communication circuitry 64 of the one or more audio systems 16 to transmit the audio 48 to the one or more audio systems 16. However, in other embodiments, particularly embodiments where the audio generation system 46 is only providing audio 48 for a particular attraction of the amusement park 10, the communication circuitry 62 of the audio generation system 46 may be directly coupled to the communication circuitry 64 of the one or more audio systems 16, for example, via cables such as sound cables, communication cables, and so forth.

In certain embodiments, the one or more audio systems 16 may also include processing circuitry, such as a processor 66 and a memory 68, which may be used to process the audio 48 received from the audio generation system 46, and to broadcast the audio 48 into a physical environment around the one or more audio systems 16. More specifically, the processor 66 may execute processor-executable instructions stored in a tangible non-transitory computer-readable medium, such as the memory 68 and/or other storage, to process the audio 48 received from the audio generation system 46, and to broadcast the audio 48. In certain embodiments, the processor 66 may be a general-purpose processor, system-on-chip (SoC) device, an application-specific integrated circuit (ASIC), or some other similar processor configuration.

In certain embodiments, the portable electronic device 12 may be a mobile phone (e.g., a smartphone), a tablet computer, a wearable device (e.g., such as augmented reality (AR) glasses, AR goggles, watches, and so forth) or any other suitable device that can be carried around the amusement park 10 by a guest 20, and that is configured to run an application to display in-application messaging information related to a particular attraction of the amusement park 10 based at least in part on the audio watermarking 50 encoded within the audio 48, which may be detected by one or more audio sensors 70 (e.g., microphones, and so forth) of the portable electronic device 12. In certain embodiments, the one or more audio sensors 70 may detect the audio 48 by passively listening for the audio 48. However, in other embodiments, the one or more audio sensors 70 may be prompted to actively listen for the audio 48 based at least in part on a user request received via an input device 72 (e.g., button, touch screen, and so forth) of the portable electronic device 12.

In certain embodiments, to provide the in-application messaging based at least in part on the audio watermarking 50 encoded within the received audio 48, the portable electronic device 12 may include processing circuitry, such as a processor 74 and a memory 76. In certain embodiments, the processor 74 may be a general-purpose processor, system-on-chip (SoC) device, an application-specific integrated circuit (ASIC), or some other similar processor configuration. The processor 74 may execute processor-executable instructions stored in a tangible non-transitory computer-readable medium, such as the memory 76 and/or other storage, to identify the audio watermarking 50 encoded within the audio 48, and to cause a display 78 of the portable electronic device 12 to display in-application messaging information 80 based at least in part on the audio watermarking 50. In certain embodiments, the processor 74 may execute processor-executable instructions to identify the audio watermarking 50 by decoding the audio watermarking 50 encoded within the audio 48 utilizing audio watermarking algorithms, such as spread spectrum audio watermarking algorithms, low bit audio watermarking algorithms, phase coding audio watermarking algorithms, echo hiding audio watermarking algorithms, time scale modification audio watermarking algorithms, amplitude modification audio watermarking algorithms, replica modulation audio watermarking algorithms, dither audio watermarking algorithms, self-marking audio watermarking algorithms, or some combination thereof.

In certain embodiments, the processor 74 may execute processor-executable instructions to determine the in-application messaging information 80 locally based at least in part on the audio watermarking 50 by, for example, accessing the in-application messaging information 80 from a tangible non-transitory computer-readable medium, such as the memory 76 and/or other storage, of the portable electronic device 12. However, in other embodiments, the processor 74 may execute processor-executable instructions to cause communication circuitry 82 of the portable electronic device 12 to wirelessly transmit a signal indicative of the audio watermarking 50 to the communication circuitry 62 of the audio generation system 46, wherein the audio generation system 46 is configured to determine the in-application messaging information 80 based at least in part on the signal received from the portable electronic device 12 by, for example, accessing the in-application messaging information 80 from a tangible non-transitory computer-readable medium, such as the memory 60 and/or other storage, of the audio generation system 46, and to transmit the in-application messaging information 80 back to the portable electronic device 12 via wireless communication of the communication circuitry 62, 82.

In certain embodiments, the in-application messaging information 80 may include closed captioning information, open captioning information, live captioning information, multilingual translation information, guided tour information, hidden secret information, or some combination thereof. For example, in certain embodiments, the in-application messaging information 80 may include captioning that directly relates to the audio 48 and/or video 54 that is being broadcast in the vicinity of a particular attraction 24 of the amusement park 10. In other embodiments, the in-application messaging information 80 may include multilingual translations that relates to the audio 48 and/or video 54 that is being broadcast in the vicinity of a particular attraction 24 of the amusement park 10. For example, if a setting of a portable electronic device 12 being used by a guest 20 indicates that a preferred language is Spanish, whereas the audio 48 and/or video 54 being broadcast in the vicinity of a particular attraction 24 of the amusement park 10 is in English, the in-application messaging information 80 may provide a translation of the audio 48 and/or video 54. In other embodiments, the in-application messaging information 80 may include guided tour information, for example, which may provide further information about a particular attraction 24 and/or the amusement park 10 in general. In other embodiments, the in-application messaging information 80 may include hidden secrets about a particular attraction 24 and/or the amusement park 10 in general, to which other guests 20 may not be privy.

As described in greater detail herein, the processor 74 of the portable electronic device 12 may execute processor-executable instructions to execute an application 84 that displays the in-application messaging information 80 via the display 78 of the portable electronic device 12. In certain embodiments, the processor 74 may execute processor-executable instructions to launch the application 84 in response to identification of the audio watermarking 50. In other embodiments, in situations where the in-application messaging information 80 is determined by the portable electronic device 12 locally, the processor 74 may execute processor-executable instructions to launch the application 84 in response to determination of the in-application messaging information 80. In other embodiments, in situations where the in-application messaging information 80 is determined by the audio generation system 46, the audio generation system 46 may send a control signal to the portable electronic device 12 to launch the application 84, and to display the in-application messaging information 80 via the application 84, in response to determination of the in-application messaging information 80.

Similarly, the video generation system 52 may include processing circuitry, such as a processor 86 and a memory 88, which may be used to generate the video 54 that includes the video watermarking 56 related to a particular attraction of the amusement park 10. More specifically, the processor 86 may execute processor-executable instructions stored in a tangible non-transitory computer-readable medium, such as the memory 88 and/or other storage, to generate the video watermarking 56 utilizing video watermarking algorithms, such as spread spectrum video watermarking algorithms, low bit video watermarking algorithms, phase coding video watermarking algorithms, echo hiding video watermarking algorithms, time scale modification video watermarking algorithms, amplitude modification video watermarking algorithms, replica modulation video watermarking algorithms, dither video watermarking algorithms, self-marking video watermarking algorithms, or some combination thereof, and to encode the video watermarking 56 within the video 54 that is provided to the one or more display systems 28. In certain embodiments, the processor 86 may be a general-purpose processor, system-on-chip (SoC) device, an application-specific integrated circuit (ASIC), or some other similar processor configuration.

In certain embodiments, the video generation system 52 may be configured to communicate the video 54 to the one or more display systems 28 located around the amusement park 10 via the wireless communication system 18. In such embodiments, the video generation system 52 may include communication circuitry 90 configured to wirelessly communicate with communication circuitry 92 of the one or more display systems 28 to transmit the video 54 to the one or more display systems 28. However, in other embodiments, particularly embodiments where the video generation system 52 is only providing video 54 for a particular attraction of the amusement park 10, the communication circuitry 90 of the video generation system 52 may be directly coupled to the communication circuitry 92 of the one or more display systems 28, for example, via cables such as video cables, communication cables, and so forth.

In certain embodiments, the one or more display systems 28 may also include processing circuitry, such as a processor 94 and a memory 96, which may be used to process the video 54 received from the video generation system 52, and to broadcast the video 54 into a physical environment around the one or more display systems 28. More specifically, the processor 94 may execute processor-executable instructions stored in a tangible non-transitory computer-readable medium, such as the memory 96 and/or other storage, to process the video 54 received from the video generation system 52, and to broadcast the video 54. In certain embodiments, the processor 94 may be a general-purpose processor, system-on-chip (SoC) device, an application-specific integrated circuit (ASIC), or some other similar processor configuration.

In certain embodiments, the portable electronic device 12 may be configured to run the application 84 to display the in-application messaging information 80 related to a particular attraction of the amusement park 10 based at least in part on the video watermarking 56 encoded within the video 54, which may be detected by one or more cameras 98 of the portable electronic device 12. In particular, in certain embodiments, a guest 20 may direct the one or more cameras 98 at the video 54 such that the video 54 may be detected by the one or more cameras 98. In addition, as described in greater detail herein, in certain embodiments, the processor 74 of the portable electronic device 12 may execute processor-executable instructions to cause any video captured by the one or more cameras 98 to be displayed via the application 84 in conjunction with the in-application messaging information 80.

In certain embodiments, to provide the in-application messaging based at least in part on the video watermarking 56 encoded within the received video 54, the processor 74 of the portable electronic device 12 may execute processor-executable instructions to identify the video watermarking 56 encoded within the video 54, and to cause the display 78 of the portable electronic device 12 to display the in-application messaging information 80 based at least in part on the video watermarking 56. In certain embodiments, the processor 74 may execute processor-executable instructions to identify the video watermarking 56 by decoding the video watermarking 56 encoded within the video 54 utilizing video watermarking algorithms, such as spread spectrum video watermarking algorithms, low bit video watermarking algorithms, phase coding video watermarking algorithms, echo hiding video watermarking algorithms, time scale modification video watermarking algorithms, amplitude modification video watermarking algorithms, replica modulation video watermarking algorithms, dither video watermarking algorithms, self-marking video watermarking algorithms, or some combination thereof.

In certain embodiments, the processor 74 of the portable electronic device 12 may execute processor-executable instructions to determine the in-application messaging information 80 locally based at least in part on the video watermarking 56 by, for example, accessing the in-application messaging information 80 from a tangible non-transitory computer-readable medium, such as the memory 76 and/or other storage, of the portable electronic device 12. However, in other embodiments, the processor 74 may execute processor-executable instructions to cause the communication circuitry 82 of the portable electronic device 12 to wirelessly transmit a signal indicative of the video watermarking 56 to the communication circuitry 90 of the video generation system 52, wherein the video generation system 52 is configured to determine the in-application messaging information 80 based at least in part on the signal received from the portable electronic device 12 by, for example, accessing the in-application messaging information 80 from a tangible non-transitory computer-readable medium, such as the memory 88 and/or other storage, of the video generation system 52, and to transmit the in-application messaging information 80 back to the portable electronic device 12 via wireless communication of the communication circuitry 82, 90.

As described in greater detail herein, the processor 74 of the portable electronic device 12 may execute processor-executable instructions to execute the application 84 that displays the in-application messaging information 80 via the display 78 of the portable electronic device 12. In certain embodiments, the processor 74 may execute processor-executable instructions to launch the application 84 in response to identification of the video watermarking 56. In other embodiments, in situations where the in-application messaging information 80 is determined by the portable electronic device 12 locally, the processor 74 may execute processor-executable instructions to launch the application 84 in response to determination of the in-application messaging information 80. In other embodiments, in situations where the in-application messaging information 80 is determined by the video generation system 52, the video generation system 52 may send a control signal to the portable electronic device 12 to launch the application 84, and to display the in-application messaging information 80 via the application 84, in response to determination of the in-application messaging information 80.

Figures 3, 4:
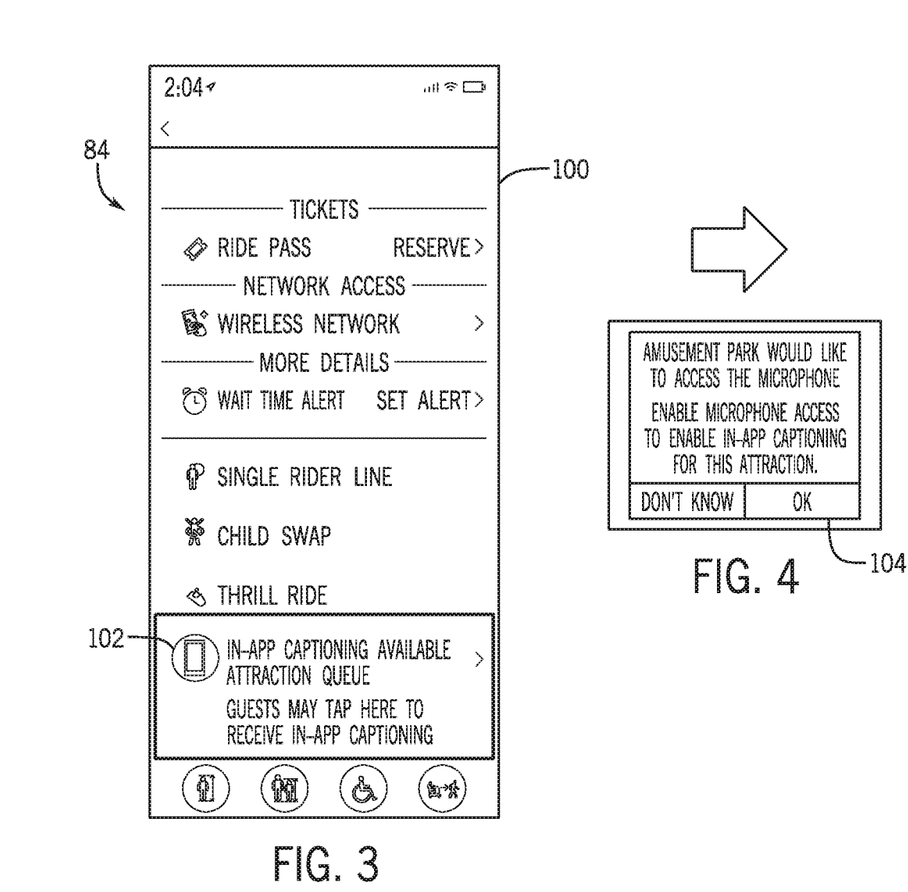
FIG. 3 is a screenshot of the application of the in-application messaging system, depicting a main menu screen, in accordance with embodiments of the present disclosure.
FIG. 4 is a depiction of a prompt for a guest to confirm access to an audio device of a portable electronic device running the application, in accordance with embodiments of the present disclosure.
Figure 5:
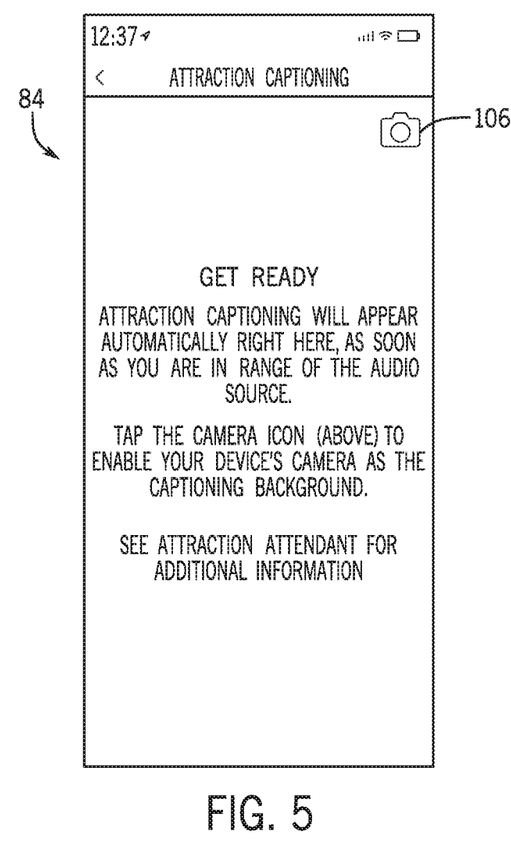
FIG. 5 is a screenshot of the application of the in-application messaging system, notifying the guest that in-application messaging will appear via the application, in accordance with embodiments of the present disclosure.

The in-application messaging provided by the in-application messaging system 14 described herein may be optional for guests 20 of the amusement park 10. FIGS. 3 through 10 depict a series of screenshots of the application 84 described herein to illustrate how guests 20 may opt in to certain in-application messaging features described herein. Although these series of screenshots depict options presented by the application 84 relating to in-application captioning information, it will be appreciated that similar options relating to the other types of in-application messaging information 80 may be presented by the application 84 as well. FIG. 3 depicts a screenshot of a main menu screen 100 of the application 84, which includes an "In-application Captioning Available" menu option 102 that may be selected by a guest 20 via the application 84 to enable in-application captioning information via the application 84. If the guest 20 selects the "In-application Captioning Available" menu option 102, a prompt 104 may be initiated via the application 84 to ensure that the guest 20 approves of the application 84 accessing an audio sensor 70 (e.g., microphone) of the portable electronic device 12 that is running the application 84 (see, e.g., FIG. 4). If the guest 20 selects "Okay" via the prompt 104 (i.e., to enable the audio sensor 70 of the portable electronic device 12), the application 84 will advise the guest that the in-application captioning will begin appearing automatically (e.g., as the audio sensor 70 of the portable electronic device 12 listens for audio 48 that may include audio watermarking 50, as described in greater detail herein) as soon as the portable electronic device 12 (and, more specifically, the audio sensor 70 of the portable electronic device 12) is in range of an audio source (e.g., the audio systems 16 of the amusement park 10) (see, e.g., FIG. 5). It will be appreciated that, if the portable electronic device 12 is not in range of an audio source, a blank screen may be shown via the application 84.

Figure 6:
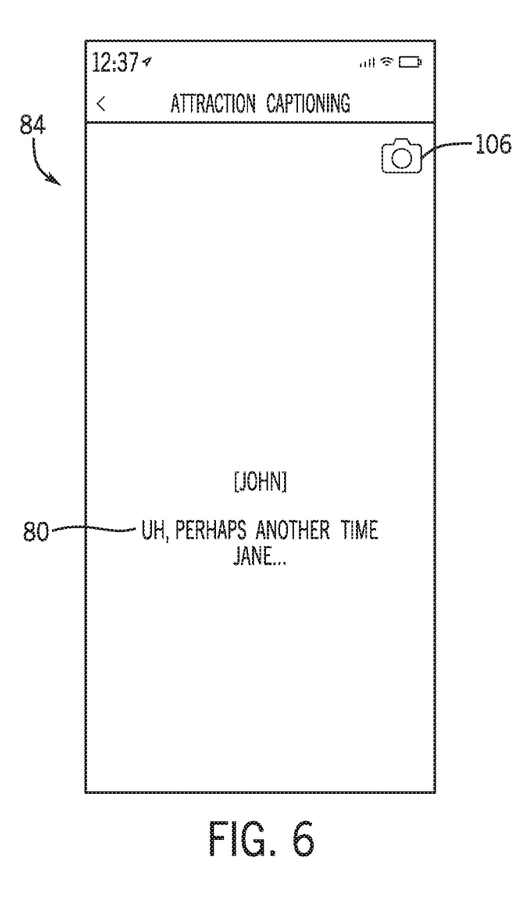
FIG. 6 is a screenshot of the application of the in-application messaging system, depicting in-application messaging being presented via the application, in accordance with embodiments of the present disclosure.
Figure 7:
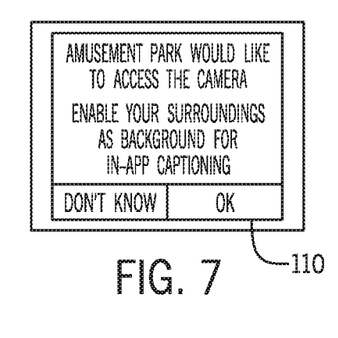
FIG. 7 is a depiction of a prompt for a guest to confirm access to a camera of a portable electronic device running the application, in accordance with embodiments of the present disclosure.
Figure 8:
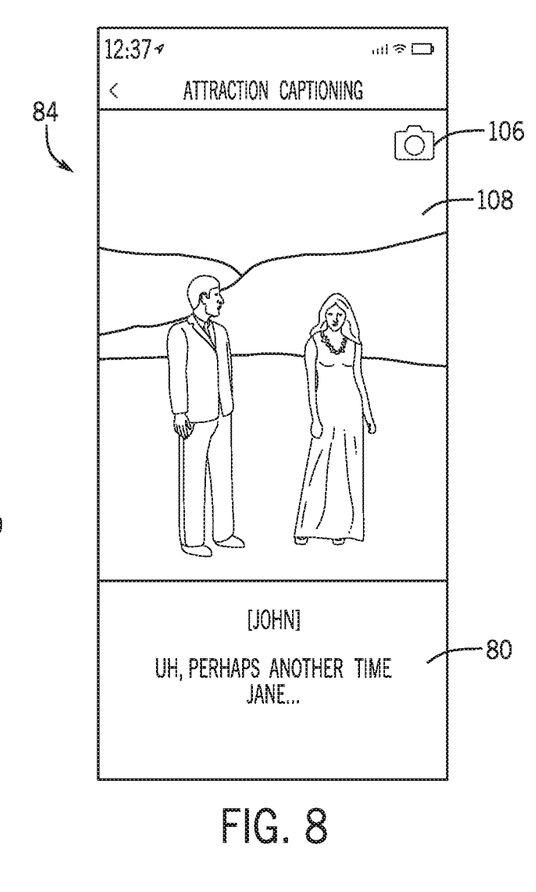
FIG. 8 is a screenshot of the application of the in-application messaging system, depicting in-application messaging in conjunction with captured video presented via the application, in accordance with embodiments of the present disclosure.

As described in greater detail herein, in certain embodiments, the in-application messaging information 80 (e.g., the in-application captioning information illustrated in FIG. 6) displayed via the application 84 may be supplemented by video 108 captured by one or more cameras 98 of the portable electronic device 12 that is running the application 84. For example, the application 84 may display a camera icon 106, which may be selected by a guest 20 via the application 84 to enable video 108 captured via one or more cameras 98 of the portable electronic device 12 that is running the application 84 to be displayed in conjunction with the in-application messaging information 80. FIG. 6 illustrates the application 84 with in-application messaging enabled, but with a camera 98 of the portable electronic device 12 disabled. If the guest 20 clicks on the camera icon 106, a prompt 110 may be initiated via the application 84 to ensure that the guest 20 approves of the application 84 accessing a camera 98 of the portable electronic device 12 that is running the application 84 (see, e.g., FIG. 7). If the guest 20 selects "Okay" via the prompt 110 (i.e., to enable the camera 98 of the portable electronic device 12), the application 84 will begin displaying video 108 captured via one or more cameras 98 of the portable electronic device 12 that is running the application 84, for example, with the in-application messaging information 80 overlaid on top of the video 108 (see, e.g., FIG. 8). It will be appreciated that the guest 20 may toggle the video 108 on/off by clicking the camera icon 106.

Figure 9:
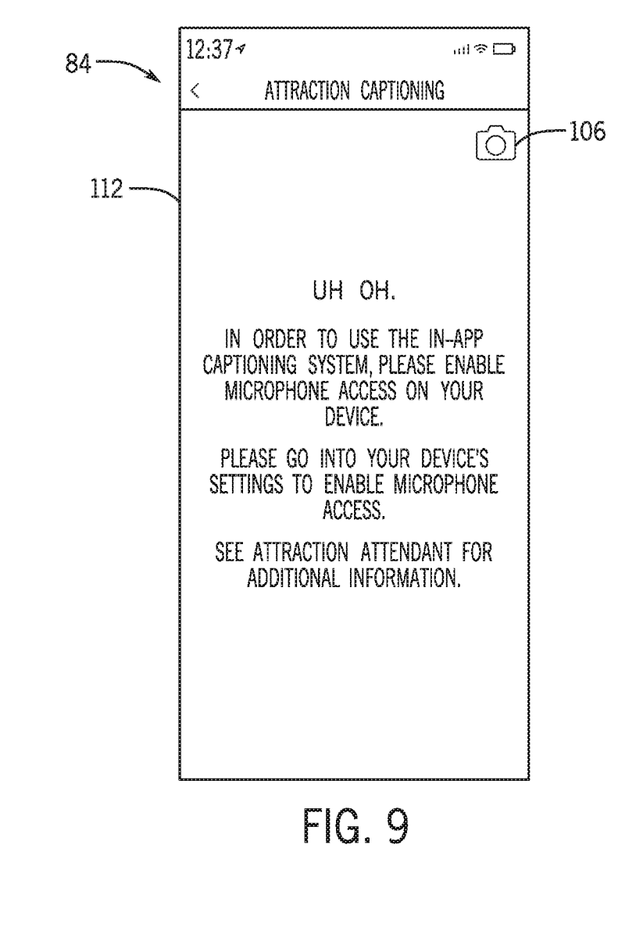
FIG. 9 is a screenshot of the application of the in-application messaging system, depicting a message being presented to the guest that access to an audio device of the portable electronic needs to be enabled, in accordance with embodiments of the present disclosure.
Figure 10:
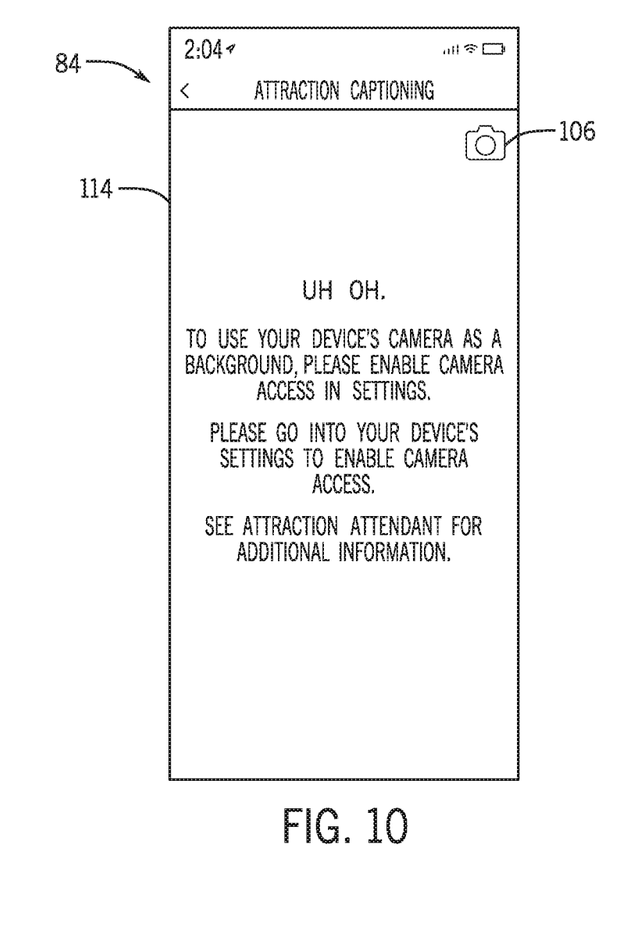
FIG. 10 is a screenshot of the application of the in-application messaging system, depicting a message being presented to the guest that access to a camera of the portable electronic needs to be enabled, in accordance with embodiments of the present disclosure.

In certain circumstances, the portable electronic device 12 being used by the guest 20 may not have certain settings selected to enable the audio sensor 70 (e.g., microphone) or the camera 98 of the portable electronic device 12 to be used by the application 84. In such instances, the application may prompt the use that access to these components of the portable electronic device 12 is required to enable the particular features selected by the guest 20 via the application 84. For example, FIG. 9 depicts the application 84 displaying a message 112 to the guest 20 that access to the audio sensor 70 (e.g., microphone) of the portable electronic device 12 needs to be enabled in order to use the in-application messaging feature of the application 84, and FIG. 10 depicts the application 84 displaying a message 114 to the guest 20 that access to the camera 98 of the portable electronic device 12 needs to be enabled in order to use the video capture feature of the portable electronic device 12.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. An in-application messaging system, comprising:
an audio generation system configured to encode at least one audio watermark within an audio signal generated for a cinematic presentation of an attraction of an amusement park, and to broadcast the audio signal into a physical environment of the amusement park; and
a portable electronic device configured to receive the audio signal from the physical environment of the amusement park, to identify the at least one audio watermark encoded within the audio signal, and to display in-application messaging information relating to the cinematic presentation of the attraction via an application running on the portable electronic device during the cinematic presentation of the attraction, wherein the in-application messaging information is based at least in part on the at least one audio watermark, and wherein the in-application messaging information supplements the cinematic presentation of the attraction.

2. The in-application messaging system of claim 1, wherein the portable electronic device is configured to determine the in-application messaging information relating to the cinematic presentation of the attraction based at least in part on the at least one audio watermark.

3. The in-application messaging system of claim 2, wherein the portable electronic device is configured to access the in-application messaging information relating to the cinematic presentation of the attraction from a computer-readable memory medium of the portable electronic device.

4. The in-application messaging system of claim 2, wherein the portable electronic device is configured to wirelessly access the in-application messaging information relating to the cinematic presentation of the attraction from the audio generation system.

5. The in-application messaging system of claim 1, wherein the portable electronic device is configured to transmit a signal indicative of the at least one audio watermark to the audio generation system, and wherein the audio generation system is configured to determine the in-application messaging information relating to the cinematic presentation of the attraction based at least in part on the signal received from the portable electronic device, and to transmit the in-application messaging information relating to the cinematic presentation of the attraction to the portable electronic device.

6. The in-application messaging system of claim 5, wherein the audio generation system is configured to transmit a control signal to the portable electronic device to launch the application in response to determination of the in-application messaging information relating to the cinematic presentation of the attraction.

7. The in-application messaging system of claim 1, comprising:
a video generation system configured to encode at least one video watermark within a video signal generated for the cinematic presentation of the attraction, and to broadcast the video signal into the physical environment of the amusement park, wherein the portable electronic device is configured to receive the video signal from the physical environment of the amusement park, and to identify the at least one video watermark encoded within the video signal, wherein the in-application messaging information is based at least in part on the at least one video watermark.

8. The in-application messaging system of claim 1, wherein the portable electronic device is configured to identify the at least one audio watermark using spread spectrum audio watermarking algorithms, low bit audio watermarking algorithms, phase coding audio watermarking algorithms, echo hiding audio watermarking algorithms, time scale modification audio watermarking algorithms, amplitude modification audio watermarking algorithms, replica modulation audio watermarking algorithms, dither audio watermarking algorithms, self-marking audio watermarking algorithms, or some combination thereof.

9. The in-application messaging system of claim 1, wherein the in-application messaging information relating to the cinematic presentation of the attraction comprises closed captioning information, open captioning information, live captioning information, multilingual translation information, guided tour information, hidden secret information, or some combination thereof.

10. A portable electronic device, comprising:
one or more audio sensors configured to detect an audio signal broadcast into a physical environment of an amusement park as part of a cinematic presentation of an attraction of the amusement park; and
processing circuitry configured to identify at least one audio watermark encoded within the audio signal, and to cause a display of the portable electronic device to display in-application messaging information relating to the cinematic presentation of the attraction based at least in part on the at least one audio watermark during the cinematic presentation of the attraction, wherein the in-application messaging information supplements the cinematic presentation of the attraction.

11. The portable electronic device of claim 10, wherein the processing circuitry is configured to determine the in-application messaging information relating to the cinematic presentation of the attraction based at least in part on the at least one audio watermark.

12. The portable electronic device of claim 11, wherein the processing circuitry is configured to access the in-application messaging information relating to the cinematic presentation of the attraction from a computer-readable memory medium of the portable electronic device.

13. The portable electronic device of claim 11, wherein the processing circuitry is configured to wirelessly access the in-application messaging information relating to the cinematic presentation of the attraction from a computer-readable memory medium separate from the portable electronic device.

14. The portable electronic device of claim 11, wherein the processing circuitry is configured to launch an application in response to identification of the at least one audio watermark.

15. The portable electronic device of claim 11, wherein the one or more audio sensors is configured to detect the audio signal by passively listening for the audio signal.

16. The portable electronic device of claim 11, wherein the one or more audio sensors is configured to detect the audio signal by actively requesting the audio signal based at least in part on a user input received via an input device of the portable electronic device.

17. The portable electronic device of claim 11, comprising at least one camera configured to capture video, wherein the processing circuitry is configured to cause the display of the portable electronic device to display the video in conjunction with the in-application messaging information relating to the cinematic presentation of the attraction.

18. The portable electronic device of claim 11, comprising at least one camera configured to receive a video signal broadcast into the physical environment of the amusement park as part of the cinematic presentation of the attraction, and wherein the processing circuitry is configured to identify at least one video watermark encoded within the video signal, and to cause the display of the portable electronic device to display the in-application messaging information relating to the cinematic presentation of the attraction based at least in part on the video watermark.

19. The portable electronic device of claim 11, wherein the processing circuitry is configured to identify the at least one audio watermark using spread spectrum audio watermarking algorithms, low bit audio watermarking algorithms, phase coding audio watermarking algorithms, echo hiding audio watermarking algorithms, time scale modification audio watermarking algorithms, amplitude modification audio watermarking algorithms, replica modulation audio watermarking algorithms, dither audio watermarking algorithms, self-marking audio watermarking algorithms, or some combination thereof.

20. The portable electronic device of claim 11, wherein the in-application messaging information relating to the cinematic presentation of the attraction comprises closed captioning information, open captioning information, live captioning information, multilingual translation information, guided tour information, hidden secret information, secret information, or some combination thereof.

21. An in-application messaging system, comprising:
an audio generation system configured to encode at least one audio watermark within an audio signal; and
one or more audio systems configured to broadcast the audio signal into a physical environment of an amusement park as part of a cinematic presentation of an attraction of the amusement park during the cinematic presentation of the attraction, wherein the audio signal supplements the cinematic presentation of the attraction.

22. The in-application messaging system of claim 21, wherein the audio generation system is configured to:
receive a signal from a portable electronic device, wherein the signal is indicative of the at least one audio watermark;
determine in-application messaging information relating to the cinematic presentation of the attraction based at least in part on the signal received from the portable electronic device; and
transmit the in-application messaging information relating to the cinematic presentation of the attraction to the portable electronic device.

23. The in-application messaging system of claim 22, wherein the audio generation system is configured to transmit a control signal to the portable electronic device to display the in-application messaging information via an application running on the portable electronic device.

24. The in-application messaging system of claim 23, wherein the audio generation system is configured to transmit a control signal to the portable electronic device to launch the application in response to determination of the in-application messaging information relating to the cinematic presentation of the attraction.

25. The in-application messaging system of claim 22, wherein the in-application messaging information relating to the cinematic presentation of the attraction comprises closed captioning information, open captioning information, live captioning information, multilingual translation information, guided tour information, hidden secret information, or some combination thereof.

26. The in-application messaging system of claim 21, wherein the audio generation system is configured to encode the at least one audio watermark within the audio signal using spread spectrum audio watermarking algorithms, low bit audio watermarking algorithms, phase coding audio watermarking algorithms, echo hiding audio watermarking algorithms, time scale modification audio watermarking algorithms, amplitude modification audio watermarking algorithms, replica modulation audio watermarking algorithms, dither audio watermarking algorithms, self-marking audio watermarking algorithms, or some combination thereof.

* * * * *